Figure 1:
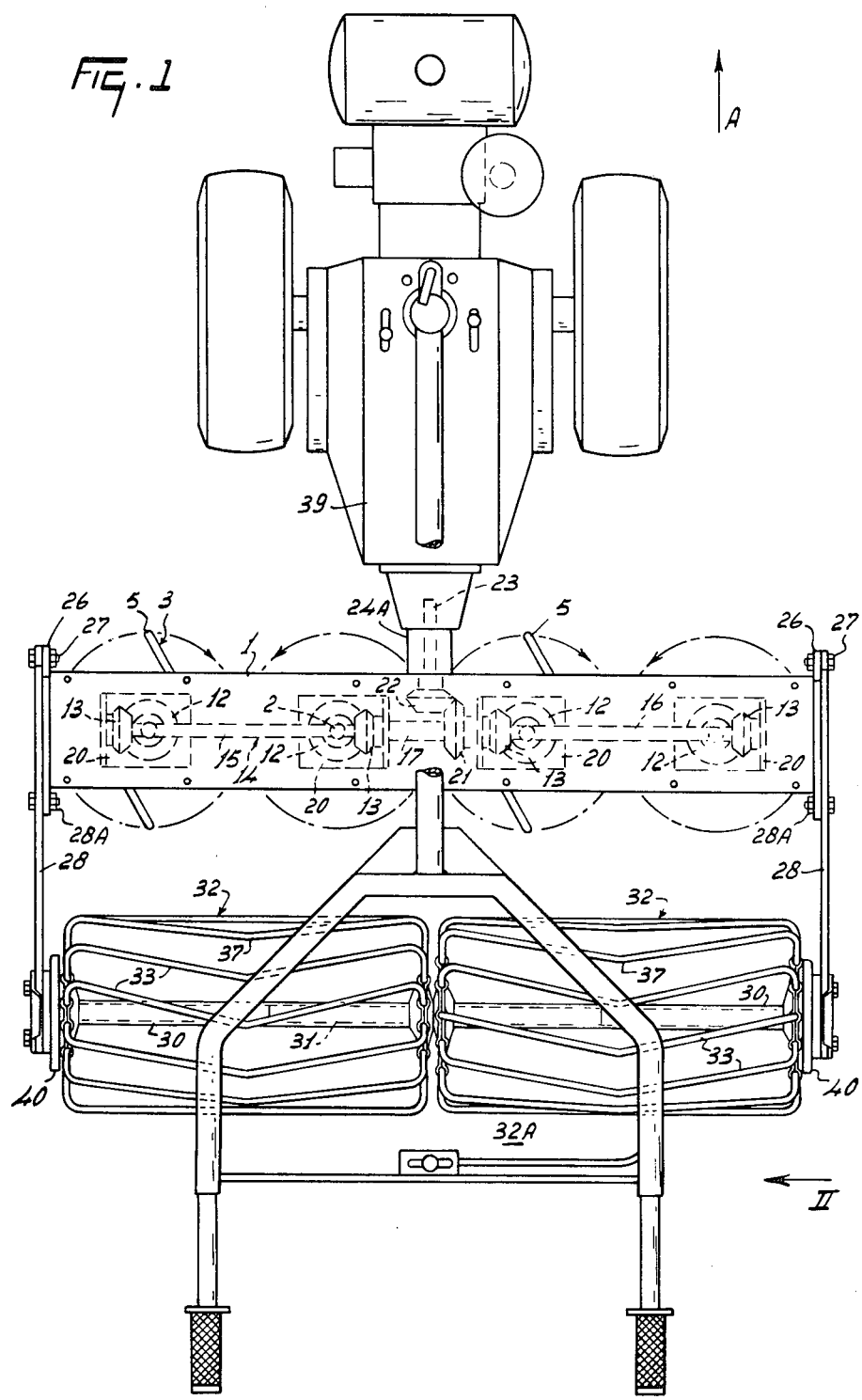

United States Patent [19]

van der Lely et al.

[11] 4,043,400
[45] Aug. 23, 1977

[54] HARROWS

[75] Inventors: Cornelis van der Lely, Zug, Switzerland; Ary van der Lely, Maasland, Netherlands

[73] Assignee: C. van der Lely N. V., Maasland, Netherlands

[21] Appl. No.: 732,093

[22] Filed: Oct. 13, 1976

Related U.S. Application Data

[63] Continuation of Ser. No. 369,918, June 14, 1973, abandoned.

[30] Foreign Application Priority Data

June 23, 1972 Netherlands .......................... 7208617

[51] Int. Cl.² ...................... A01B 33/06; A01B 49/02; A01B 33/08
[52] U.S. Cl. .......................................... 172/43; 172/59; 172/111; 172/532
[58] Field of Search ....................... 172/39, 43, 59, 68, 172/111, 121, 526, 543, 552, 556

[56] References Cited

U.S. PATENT DOCUMENTS

| 763,324 | 6/1904 | Roberts | 172/552 X |
| 1,645,115 | 10/1927 | Richardson | 172/422 |
| 3,032,121 | 5/1962 | Carter | 172/556 X |
| 3,220,488 | 11/1965 | Becker | 172/543 X |
| 3,774,687 | 11/1973 | van der Lely | 172/111 X |
| 3,774,688 | 7/1971 | van der Lely et al. | 172/59 |

*Primary Examiner*—Stephen C. Pellegrino
*Attorney, Agent, or Firm*—Mason, Mason & Albright

[57] ABSTRACT

This invention relates to harrows, such harrows being of the kind comprising a frame portion that is movable over the ground and that is provided with a plurality of soil working members or rotors arranged to turn about corresponding upwardly extending axes, the frame portion being sustained from the ground during the use of the harrow by a rotary supporting member.

9 Claims, 6 Drawing Figures

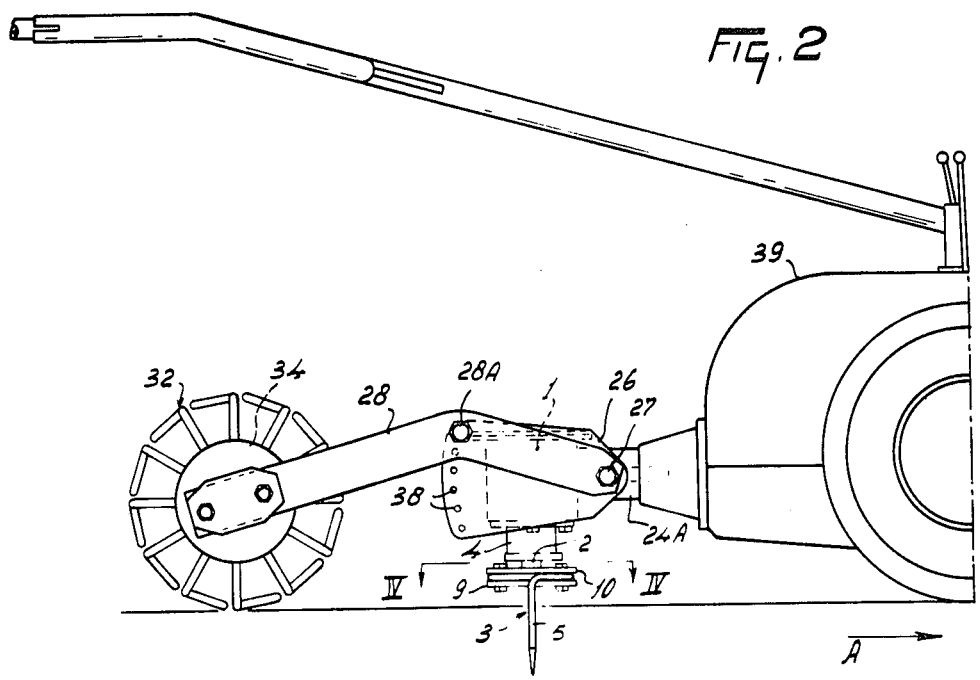
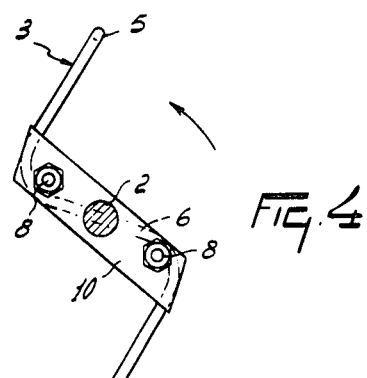
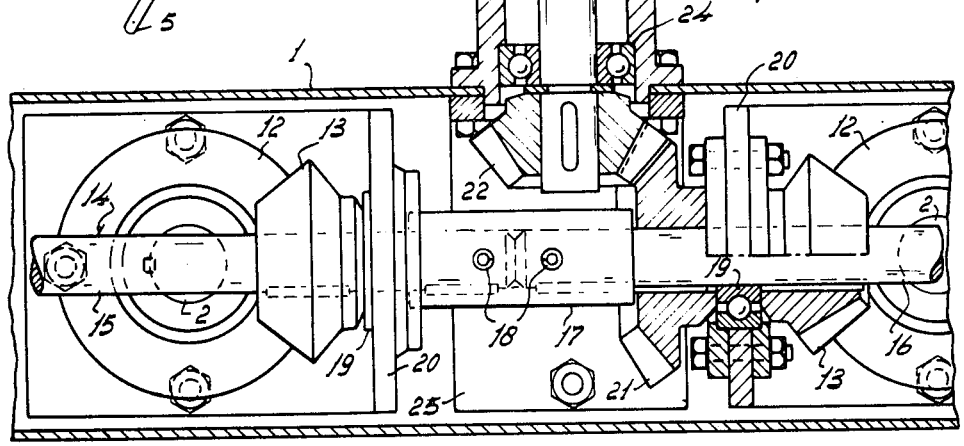

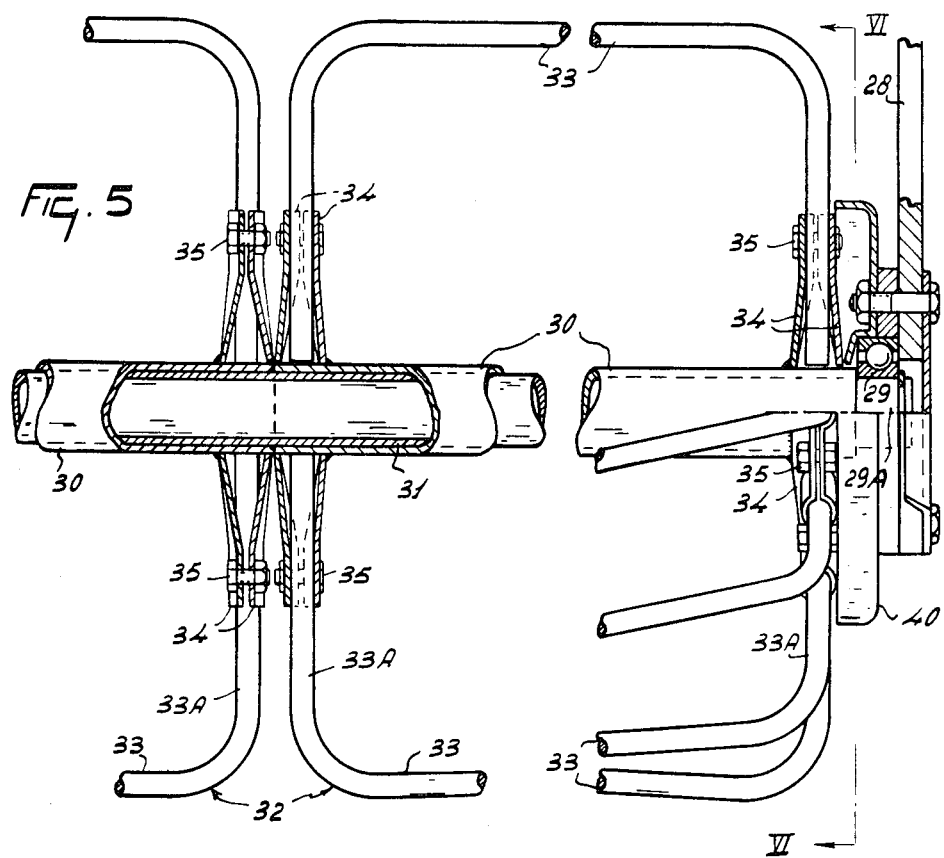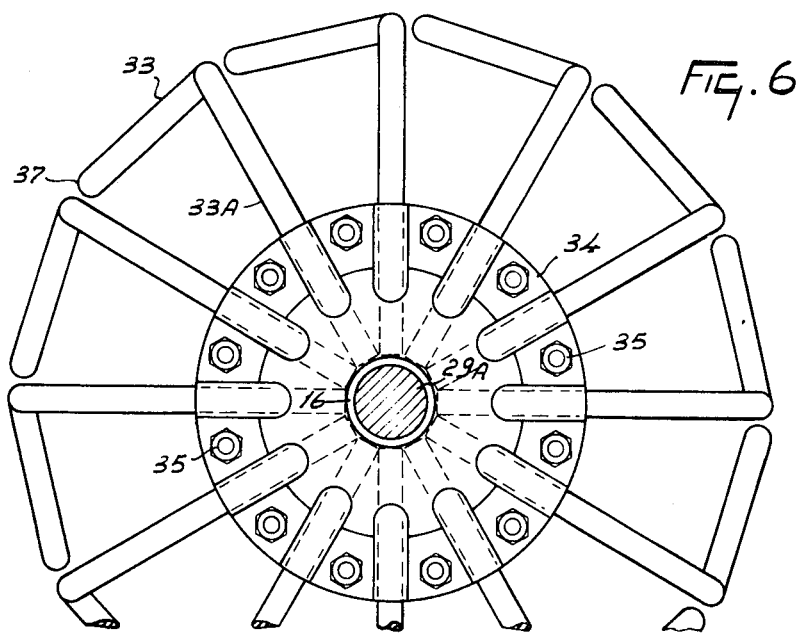

HARROWS

This application is a continuation of Ser. No. 369,918 filed June 14, 1973 now abandoned.

According to the invention, there is provided a harrow of the kind set forth, wherein the rotary supporting member comprises at least two separate but neighbouring portions that are located to the rear of the soil working members or rotors with respect to the intended direction of operative travel of the harrow.

For a better understanding of the invention, and to show how the same may be carried into effect, reference will now be made, by way of example, to the accompanying drawings, in which:

FIG. 1 is a plan view of a rotary harrow in accordance with the invention,

FIG. 2 is a side elevation as seen in the direction indicated by an arrow II in FIG. 1, FIG. 3 is a sectional plan view, to an enlarged scale, showing driving members that can be seen in FIG. 1 in greater detail, FIG. 4 is a section, to an enlarged scale, taken on the line IV—IV of FIG. 2, FIG. 5 is a part-sectional plan view, to an enlarged scale, illustrating the construction of a rotary supporting member of the harrow in greater detail, and FIG. 6 is a section taken on the line VI—VI of FIG. 5 with lower portions of the rotary supporting member omitted.

Referring to the drawings, the rotary harrow or soil cultivating implement that is illustrated has a hollow frame portion 1 that extends substantially horizontally perpendicular to the intended direction of operative travel of the harrow that is indicated by an arrow A in FIGS. 1 and 2 of the drawings. The hollow frame portion 1 rotatably supports a row of four vertical or at least upright shafts 2 that are spaced apart from one another by equal distances of not more than 30 centimeters and preferably substantially 25 centimeters. Vertical bearings 4 rotatably support the shafts 2 beneath the frame portion 1 and the lower ends of the shafts 2 carry corresponding soil working members or rotors 3 each of which is provided with a pair of soil working tines 5. The tines 5 project downwardly away from the lower ends of the corresponding shafts 2 and each pair of tines 5 is formed from a single length of resilient material, such as spring steel, of circular cross-section. When seen in elevation in a horizontal direction transverse to a plane containing the upright soil working portions of a pair of the tines 5, said pair is of generally inverted U-shaped configuration. The soil working portions of the tines 5 whose free ends are preferably pointed extend substantially parallel to the axes of rotation that are afforded by the longitudinal axes of the corresponding shafts 2. Each pair of tines 5 includes a substantially horizontally extending web 6 that is contained in a plan substantially perpendicular to the longitudinal axes of the two soil working portions, said web 6 serving as a fastening portion for the two tines 5 and being clamped by bolts 8 between a lower plate 9 and an upper plate 10. The upper clamping plate 10 is rigidly and perpendicularly secured to the lowermost end of the corresponding shaft 2 and the bolts 8 are located at diametrically opposite sides of the shaft 2 concerned and also at opposite sides of the web 6 which web, as seen in the plan view of FIG. 4, is of approximately S-shaped configuration.

Each shaft 2 is provided, inside the hollow frame portion 1, with a corresponding bevel pinion 12 and the teeth of these bevel pinions 12 are in driven mesh with those of smaller bevel pinions 13 mounted on a shaft 14 that extends lengthwise through the frame portion 1 between locations towards the opposite ends of the latter. The sahft 14 consists of two substantially coaxial portions 15 and 16 whose neighbouring ends are interconnected, near the centre of the main frame portion 1, by a sleeve or bush 17 and co-operating transverse pins 18. Each of the two shaft portions 15 and 16 is rotatably mounted in a corresponding horizontal bearing 19, the two bearings 19 being secured in position relative to the walls of the hollow frame portion 1 by being mounted on the limbs of angular supporting brackets 20 that have further limbs rigidly fastened to the frame portion 1. The shaft portion 16 is provided with a bevel pinion 21 close to the midpoint of the frame portion 1 and the teeth of the pinion 21 are in driven mesh with those of a smaller bevel pinion 22 fastened to the inner end of a rotary input shaft 23 which projects forwardly from the main frame portion 1 of the harrow in substantially the direction A. The rotary input shaft 23 is mounted in substantially horizontal bearings 24 located at opposite ends of a housing 24A that is fastened to the frame portion 1 by bolts and an angular supporting bracket 25 (FIG. 3).

The opposite ends of the frame portion 1 are provided with substantially vertical plates 26 whose fronts, with respect to the direction A, have corresponding arms 28 turnably connected to them with the aid of pivot bolts 27 that afford a substantially horizontal axis that is substantially perpendicular to the direction A. The rearmost ends of the two arms 28 carry corresponding horizontal bearings 29 (FIG. 5) in which stub shafts 29A at the ends of hollow tubular supports 30 are rotatably mounted. The ends of the two tubular supports 30 that are remote from the stub shafts 29A substantially adjoin one another in axial alignment and are maintained in this condition by a tubular connector 31 that is entered through both of them. Each tubular support 30 affords that axial centre of a corresponding roller 32 and it will be seen from the drawings that each roller 32 comprises twelve regularly spaced apart rods 33 that define that ground-engaging periphery of the roller 32 and that are formed from spring steel or other somewhat resilient material of circular cross-section. The portions of the rods 33 that afford the ground-engaging circumference or periphery of each roller 32 extend substantially parallel to one another and have approximately radial (with respect to the axis of rotation of the roller 32 concerned) end portions 33A that are bent over through substantially 90° with respect to the circumferential or peripheral portions under discussion. The end portions 33A are tightly clamped between pairs of plates 34 which plates are formed, for this purpose, with substantially radially extending grooves between which are disposed clamping bolts 35. The inner plate 34 of each pair with respect to the centre of the roller 32 concerned is welded to the corresponding tubular support 30 adjacent one end thereof. The arms 28 carry dished screening guards 40 that protect the adjacent plates 34 and tend to prevent the adhesion of mud and the winding around of plant stalks and the like. The tubular connector 31 can be removed from the tubular supports 30 after unbolting the arms 28 and this facilitates the rapid dismounting of the rollers 32 and also their re-assembly. The circumferential gound-engaging portions of the rods 33 of the rollers 32 are formed with shallow angular bends 37 (FIGS. 1 and 6) at points approximately midway along their lengths, the angular points of said bends 37 being directed forwardly with respect to the direction A at ground level. The provision of the bends 37 enlarges the region of contact between each rod 33 and the ground surface. The two neighbouring rollers 32 together afford a rotary supporting member 32A whose axis of rotation coincides with the common longitudinal axis of the two tubular supports 30.

It can be seen from FIG. 2 of the drawings that each arm 28 is formed as two rectilinear portions which are integrally interconnected by a sharp angular bend. A locking bolt 28A is entered through a hole in each arm 28 at the position of the corresponding bend which has just been mentioned and said bolts 28A can also be entered through chosen holes 38 that are formed in curved rows through rearmost edge regions of the plates 26. The holes 38 are equidistant from the axis defined by the pivot bolts 27 and it will be evident that the particular holes 38 that are chosen for co-operation with the two locking bolts 28A determine the level of the axis of rotation of the rotary supporting member 32A relative to the level of the remainder of the harrow. The harrow that has been described by way of example has four soil working members or rotors 3 which together provide the harrow with a working width of substantially 100 centimeters. The harrow can, as illustrated, be connected to a pedestrian-controlled tractor 39 in such a way that its rotary input shaft 23 is driven from the engine of that tractor 39 through the intermediary of a clutch and transmission members that it is not necessary to describe or illustrate. However, such an arrangement is by no means essential and it is possible to equip the harrow with more soil working members or rotors 3 to produce a total of, for example, six, eight, ten or twelve soil working members or rotors. The addition of each pair of soil working members or rotors 3 will increase the working width of the harrow by substantially 50 centimeters and, when more than four members or horizontal direction that is substantially perpendicular to the direction A that is equal to approximately half the working width of the harrow which, in the embodiment that has been described, is equal to the working width of two neighbouring members or rotors 3. Each roller 32 has a diameter which is less than its axial length and which, in the embodiment that has been described, is substantially two-thirds of the perpendicular distance between the axis of rotation thereof and a substantially vertical plane containing the axes of rotation of the shafts 2. It can be seen from FIG. 1 of the drawings that the region in which the two rollers 32 substantially adjoin one another is located substantially in alignment, in the direction A, with a region between two members or rotors 3 that rotate in opposite directions which are such that the tines 5 thereof move towards one another at the rear of those members or rotors 3 relative to the direction A. It has been found that this arrangement facilitates engagement of any stones or unroken lumps of soil by the end portions 33A of the roller rods 33 that are located substantially centrally of the rotary supporting member 32A. The rotary supporting member 32A comprises at least two portions (the two rollers 32) and it is emphasised that it is within the scope of the invention to provide more than two such portions. Each portion or roller 32 has an axial length which is substantially equal to the working width of a pair of the members or rotors 3 and thus the axial length of the rotary supporting member rotors 3 are provided, it is generally desirable to furnish the front of the hollow frame portion 1 with a coupling member, that may be of substantially triangular configuration, for co-operation with the lifting links of a three-point lifting device or hitch carried by an agricultural tractor or other operating vehicle. With such an arrangement, the rotary input shaft 23 will be placed in driven connection with the power take-off shaft of the agricultural tractor or other vehicle through the intermediary of a telescopic transmission shaft of known construction having universal joints at its opposite ends.

In the use of the rotary harrow that has been described, the pedestrian-controlled tractor 38 moves the harrow in the direction A with the soil working members or rotors revolving in the directions indicated by arrows in FIGS. 1 and 4 of the drawings. The soil working members or rotors 3 work overlapping strips of land and, in order to avoid any possibility of the tines 5 of neighbouring members or rotors 3 foulding one another, a substantially vertical plane containing the upright soil working portions of the tines 5 of one member or rotor 3 is inclined at substantially 90° to a similar plane corresponding to the, or each, neighbouring member or rotor 3. The working depth of the tines of the members or rotors 3 is controlled by the level of the axis of rotation of the rotary supporting member 32A which member is afforded by two neighbouring portions (the two rollers 32) that are independently rotatable. Each roller 32 has an effective width in a substantially 32A can easily be increased to match the working width of a harrow having, for example, six, eight, ten or twelve members or rotors 3 merely by providing one further roller 32 in respect of each additional pair of members or rotors 3. The use of the tubular connector 31 allows the rollers 32 to revolve independently of one another about a common substantially horizontal axis and this arrangement reduces the tendency for the rollers 32 to become filled with mud or other soft soil which is inclined to occur when operating on heavy and wet ground. Due to the resiliency of the rods 31 which are sustained only at opposite end regions thereof, the rollers 32 provide a flexible support of the harrow during its operation, the resiliency of the rods 31 also tending to prevent any permanent adherence of mud and lumps of soil between the rods. Progressive filling of the rollers 32 with mud or soft earth is thus avoided or greatly reduced. Any unbroken lumps of soil that are thrown to the rear by the tines 5 of the revolving members or rotors 3 are blocked by the rods of the rollers 32 and are crushed by those rods.

Although various features of the rotary harrow or soil cultivating implement that has been described and/or illustrated in the accompanying drawings will be set forth in the following claims as inventive features, it is emphasized that the invention is not necessarily limited to those features and that it includes within its scope all of the parts of the harrow or soil cultivating implement that have been described and/or illustrated both individually and in various combinations.

What we claim is:

1. A rotary harrow comprising a frame portion supporting at least four soil-working members rotatably mounted side-by-side in a row that extends transverse to the normal direction of travel on corresponding upwardly extending shafts, driving means supported by said frame portion and said driving means engaging said shafts to rotate same about axes defined by said shafts, a rotatable transversely extending supporting member being connected to said frame portion to the rear of said soil-working members, said supporting member comprising at least two portions and each of said portions having a periphery comprising ground engaging rods mounted on at least one elongated support, said rotatable portions being located adjacent one another and being rotatable about a common horizontal transverse axis, said rods extending in the same general direction as said common axis and having angular bends between their opposite ends, the points of said bends being located substantially in line with a plane that extends midway between two adjacent soil-working members and parallel to the direction of travel of the harrow.

2. A rotary harrow as claimed in claim 1, wherein said bends are shallow and said rods extend substantially straight to each side of their corresponding bends.

3. A rotary harrow as claimed in claim 2, wherein said rods have end portions that are fastened to plates secured to the elongated support.

4. A rotary harrow as claimed in claim 1, wherein said rods extend substantially parallel to one another and are comprised of resilient material having a circular cross-section.

5. A rotary harrow as claimed in claim 1, wherein the lengths of said supporting member portions are substantially the same.

6. A rotary harrow as claimed in claim 1, wherein said soil working members are arranged in pairs and the members of each pair are rotated in relative opposite directions by said driving means, said points of the rod bends being in line with the plane that extends midway between adjacent members of said pair.

7. A harrow as claimed in claim 9, wherein said rotatable portions adjoin one another in a region that is in general alignment with a further region between two of said soil working members having tines that are rotated towards one another during operation.

8. A harrow as claimed in claim 9, wherein said rods are supported solely at their opposite ends, said rods being resilient and providing flexible support for said harrow.

9. A harrow comprising a frame portion supporting a plurality of soil working members rotatably mounted side-by-side in a row that extends transverse to the normal direction of travel, said soil working members being mounted on corresponding upwardly extending shafts and driving means on said harrow in driving engagement with said shafts to rotate same, a rotatable supporting member being connected to said frame portion to the rear of said soil working members, said rotatable member comprising at least two portions which are rotatably mounted on tube means, each of said rotatable portions including ground engaging rods that extend across the width of that portion, said rods having opposite ends that are bent towards said tube means and fastened to plate means secured to said tube means, said rotatable portions being located adjacent one another and being independently rotatable with respect to one another about a common axis, the axial width of each portion being substantially equal to the working width of two adjacent soil working members in said row.

* * * * *